United States Patent
Koshinen et al.

[11] Patent Number: 5,905,050
[45] Date of Patent: *May 18, 1999

[54] METHOD FOR PREPARING ACTIVE CARRIER PARTICLES OF EQUAL SIZE FOR A POLYMERIZATION CATALYST

[75] Inventors: Jukka Koshinen, Espoo; Jarmo Louhelainen, Helsinki, both of Finland

[73] Assignee: Borealis Holding A/S, Lyngby, Denmark

[ * ] Notice: This patent issued on a continued prosecution application filed under 37 CFR 1.53(d), and is subject to the twenty year patent term provisions of 35 U.S.C. 154(a)(2).

[21] Appl. No.: 08/157,014
[22] PCT Filed: May 29, 1992
[86] PCT No.: PCT/FI92/00170
  § 371 Date: Nov. 30, 1993
  § 102(e) Date: Nov. 30, 1993
[87] PCT Pub. No.: WO92/21705
  PCT Pub. Date: Dec. 10, 1992

[30] Foreign Application Priority Data

May 31, 1991 [FI] Finland ..................................... 912639

[51] Int. Cl.$^6$ .................................................. B01J 35/08
[52] U.S. Cl. .............................. 502/9; 502/111; 502/113; 502/120
[58] Field of Search ............................. 502/9, 111, 113, 502/120

[56] References Cited

U.S. PATENT DOCUMENTS

| | | |
|---|---|---|
| 4,303,200 | 12/1981 | Hansen . |
| 4,421,674 | 12/1983 | Invernizzi et al. ........................... 502/9 |
| 4,506,027 | 3/1985 | Inverizzi et al. ............................ 502/9 |

FOREIGN PATENT DOCUMENTS

8707620  12/1987  WIPO .

*Primary Examiner*—Michael Lewis
*Assistant Examiner*—Thomas G. Dunn, Jr.
*Attorney, Agent, or Firm*—Birch, Stewart, Kolasch & Birch, LLP

[57] ABSTRACT

The active carrier particles of even size of the polymerization catalyst are prepared so that a melt of a complex composition is provided having the formula (I)

$$MgCl_2 \; nROH \; mED \qquad (I)$$

in which ROH depicts an aliphatic alcohol, R is a $C_1$–$C_6$ alkyl, ED depicts an electron donor, n is 1 to 6 and m is 0 to 1; the melt provided is fed to a nozzle (4); the melt is sprayed from the nozzle (4) to the spraying area (5), in which it is divided into fine melt droplets and possibly partly solidifies; the possibly partly solidified melt particles are transferred to a cooled crystallization area (6), where they crystallize to solid carrier particles; and the solid carrier particles are recovered. The melt mentioned is sprayed through a nozzle (4), which is rotated or which has attached to it a member that rotates and throws melt outwards from the rotating center to the spraying area (5).

19 Claims, 2 Drawing Sheets

METHOD FOR PREPARING ACTIVE CARRIER PARTICLES OF EQUAL SIZE FOR A POLYMERIZATION CATALYST

BACKGROUND OF THE INVENTION

1. Field of the Invention

The invention relates to a method for the preparation of solid carrier particles for a polymerization catalyst, in which there is provided a melt of a complex composition having the formula (I)

$$MgCl_2 \ nROH \ mED \qquad (I)$$

in which ROH depicts an aliphatic alcohol, R is a $C_1$–$C_6$ alkyl, ED depicts an electron donor, n is 1 to 6 and m is 0 to 1; the melt provided is fed to a nozzle; the melt is sprayed from the nozzle to a spraying area in which it is divided into fine melt droplets and solidifies to solid carrier particles; and the solid carrier particles are recovered. The invention also relates to a method in which the olefin polymerization catalyst is provided by bringing the recovered solid carrier particles together with a transition metal compound being catalytically capable of activation, such as titanium tetrachloride, and the use of the olefin polymerization catalyst thus prepared together with a cocatalyst and alternately an external electron donor for the polymerization of olefins.

2. Description of the Related Art

Polymerization catalysts and particularly catalysts of Ziegler-Natta type nowadays typically comprise an inert solid carrier, on which the actual active catalyst component or the mixture or complex formed by the catalytical compounds is layered. The chemical composition of the particles, the structure of the surface, the morphology, the particle size and the particle size distribution of such a carrier are of major significance for the activity of the catalyst and the properties of the polymer to be obtained. With a very active catalyst, namely, polymer can be produced from which thanks to its purity no catalyst residues need to be removed. The surface structure and the morphology of the carrier, on the other hand, affect on the morphology of the polymerization product itself, for it has been noticed that the morphology of the catalyst is repeated in the structure of the polymer (the so-called replica phenomenon). When the aim is a flowing product polymer having the desired morphology and a narrow particle size distribution, which is desirable in view of the objects of use of many of the processing processes, the properties of the carrier should, because of the replica phenomenon, correspond to those of the desired polymer particle.

The catalysts of the above-mentioned type are nowadays often formed of magnesium based carrier substance, which has been treated with a transition metal compound like titanium halide and often also with an electron donor compound. It is also known that a carrier can be brought into a preferred chemical composition having a certain surface structure, a certain morphology, a certain particle size and a certain particle size distribution by letting it crystallize as a complex of one of its crystal solvents.

In the method according to EP publication 65,700 and U.S. Pat. No. 4,421,674 the titanium halide is brought to react with a magnesium chloride catalyst carrier being in the form of micro balls, after which the reaction product particles are recovered by physical means and are mixed together with an organometallic compound. In this method the carrier is prepared by providing a solution, which essentially contains magnesium dichloride dissolved in ethanol and a spray-drying of the solution is carried out by spraying it into a flow of nitrogen gas, the inlet and outlet temperatures of which are high. As a result magnesium dichloride particles of very even size having the form of a ball are obtained. In this method the high temperature evaporates, however, a great deal of the crystallization solvent, whereby porosity is created on the surface of the carrier and its activation capability decreases. This leads to a solid catalyst having a satisfactory particle size distribution, but the activity and mechanical strength of the catalyst is poor due to the porosity.

In the FI-patent application 862459 (Neste Oy) there is disclosed a method for the preparation of a carrier, in which there does not appear any porosity decreasing the activity and the mechanical strength.

In the method the carrier complex formed by the carrier and the crystal solvent is melted to a clear liquid. When the liquid is conducted through the nozzle and the spraying space into the crystallizing space cooled with cold nitrogen gas the carrier complex crystallizes to small particles having a spherical form which are very flowing and loose. Furthermore, the carrier complex crystallizes without considerable evaporation of the crystal solvent. Hereby a nacreous non-porous surface is obtained, which is particularly well suitable for the preparation of an active catalyst. When such a preactivated carrier is brought into contact with a titanium compound, abundantly of catalytically active complexes between the $MgCl_2$ and the titanium compound, are formed onto the surface of the carrier, when the crystal solvent leaves.

The above-mentioned Finnish method has in result easily activating carrier compounds and complexes. A drawback of this so-called spray-crystallizing method is, however, that the droplets formed are not of fully equal size and that they are partly agglomerated. Although, as to their surface structure, more useful carrier particles are obtained by this method than e.g. by spray-drying, the problem thus is that an unsatisfactory particle size distribution is formed and that the particles are partly agglomerated.

SUMMARY OF THE INVENTION

The aim of the present invention is to provide such solid carrier particles of the polymerizing catalyst that are both active and in suitable form, loose from each other and of equal size. Hereby, the aim is to prepare new carrier particles having chemical structure, surface structure, morphology, size, and size distribution as advantageous as possible in view of the activity of the catalyst and the form, size and size distribution of the particles of the polymer to be obtained. These aims have now been reached by the improvement of the above-mentioned spray crystallizing method, for which is mainly characterizing that the melt used in the method is sprayed through a nozzle that rotates or attached to which is a member that rotates and launches the melt outwards from the rotating center to the spraying area. It has thus been realized that the preferred surface structure of the carrier particles obtained by spray-crystallization can be combined with the narrow particle size distribution by using a rotating nozzle or a corresponding device.

DETAILED DESCRIPTION OF THE INVENTION

Figure 1:
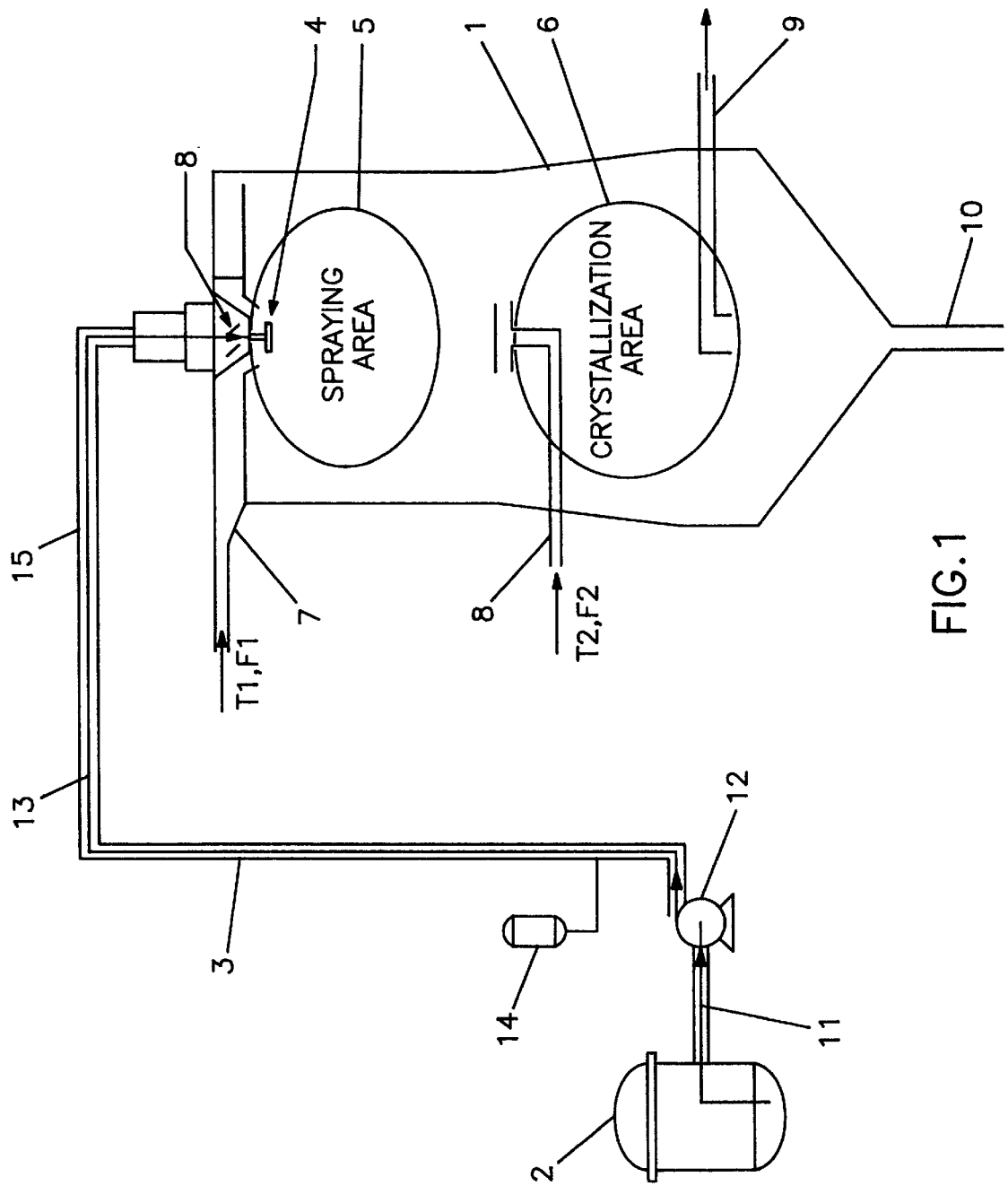

The method according to the invention begins with the stage in which a melt of the complex compound is obtained. It can take place by reacting the components of the complex compound with each other at so high a temperature that they react with each other and remain in the reaction vessel in the form of a melt complex, or so that the ready complex is melted for the use according to the present method.

As has been mentioned above, the main component of the carrier particles obtained by the method according to the invention is magnesium chloride. It must be either fully non-aqueous or its water content should be very low and it preferably shall contain 1% by weight of water at the most.

The other component of the complex compound is alcohol. It usually is an aliphatic alcohol, the alkyl group of which contains 1 to 6 carbon atoms. Preferred aliphatic alcohols are methanol and/or ethanol and the most preferable is ethanol. The alcohol used in the preparation of the complex compound must be dry and preferably it shall contain about 2% by weight of water at the most.

The third and optional component of the complex compound used in the invention is a donor compound. When selecting donor compounds the criterion is that they improve the polymerization and the drop-formation of the melt without disturbing the melting and spray-crystallization of the complex compound containing these donor compounds.

The electron donor can thus be an aliphatic or aromatic carboxylic acid, an aliphatic or aromatic alkyl ester of the carboxylic acid, an ether, an aliphatic or aromatic ketone, an aliphatic or aromatic aldehyde, an aliphatic or aromatic alcohol, an aliphatic or aromatic halide, such as acid halide, an aliphatic or aromatic nitrile, an aliphatic or aromatic amine, an aliphatic or aromatic phosphine, or an aliphatic or aromatic silicon ether. Preferred electron donors are the aromatic dicarboxylic acids, such as dialkyl phthalates, particularly di-isobutyl phthalate and the aliphatic dicarboxylic acids, such as dialkyl maleates, particularly diethyl maleate.

The preparation of the melt of the complex compound used in the method takes place so that the magnesium chloride, alcohol and possibly internal donor of the catalyst are mixed together. The portion of the magnesium chloride is hereby preferably within the range 30 to 55% by weight, the portion of alcohol preferably within the range of 55 to 70% by weight and the portion of the internal donor is preferably within the range of 0 to 0.2 gram molecular percent. The dosing order to the reactor can be any order; according to one embodiment to the reactor is first dosed the magnesium chloride and then the alcohol and the optional internal donor.

After that the reactor is closed and the heating is started. The temperature is preferably regulated above the melting point of the complex created, typically within the range 90 to 130° C., depending, however, on the composition of the complex melt created. At the final stage mixing and additional heating close to the upper limit of the temperature range can be used.

The agitation time of the melt depends on the amount of the magnesium chloride to be dosed e.g. so that 26 kg of magnesium chloride requires an agitation for four hours at the highest temperature, e.g. in regard to magnesium chloride-ethanol complex at 130° C. and 52 kg of magnesium chloride an agitation of six hours at the same temperature.

As was mentioned already in the beginning of the application, for the spray-crystallization according to the invention is prepared a melt of a complex compound having the formula (I)

  (I)

in which ROH depicts the above-mentioned aliphatic alcohol, R is $C_1$–$C_6$-alkyl, ED depicts the above-mentioned electron donor, n is a figure between 1 to 6 and m is a figure between 0 to 1, whereby m can also be 0. According to one preferred embodiment n is between 3 to 4. According to one embodiment m is of the order of magnitude about 0.05.

When the melt of the complex compound has been achieved it is fed to the nozzle. The feeding rate is hereby about 10 to 50 kg/h. The feed takes place by a dosage pump and its amount and evenness are preferably achieved by means of a valveless cylinder dosage pump and a pulse attenuator. The temperature of the melt is kept constant and accurately regulated in the feed piping and the pump preferably by the aid of the oil heating mantle of the pipe. Hereby it is advantageous that the temperature of the melt is accurately regulated a little above the melting point of the melt. The temperature should be high enough so the melt would not crystallize in the feeder line and the drop formation of the melt would be efficient due to the low viscosity and the surface tension, and, on the other hand, low enough so alcohol would not evaporate away from the nozzle. According to one embodiment the feed temperature of the melt is between 100 and 140° C. It is also advantageous if the feeding rate of the melt to the nozzle is about 10 to 50 kg/h. The amount of the evaporating alcohol is below 5% by weight. Be it mentioned that in spray-drying typically more than 30% by weight of alcohol evaporates.

After this the melt of the complex compound is sprayed from the nozzle to the spraying area, where it is divided into fine melt-droplets. According to the invention the spraying takes place through a nozzle which rotates or which has a member attached to it that rotates and draws the melt outwards from the rotating center to the spraying area. The fundamental idea of the invention is the spraying of a complex melt that does not easily form droplets to the spraying area by means of a rapidly rotating member.

The rotating member dividing the melt into droplets can be a separate member arranged in connection with the nozzle or the nozzle itself can be rotating.

The rotating rate of the rotating nozzle or the member being attached to it is according to one preferred embodiment 10,000 to 30,000 rpm, preferably 18,000 to 25,000 rpm.

To the comminution of a melt complex compound is preferably used a rotating nozzle. The nozzle is hereby preferably a hollow disc rotating around its axis, inside which the melt is led and from holes in the outer surface of the periphery of which the melt is forced out by the aid of centrifugal force. According to one embodiment the diameter of the rotating hollow disc nozzle is about 100 to 150 mm. Its outer periphery surface hereby has preferably four nozzle holes, the diameter of which preferably is about 4 mm. The rotating hollow disc nozzle is preferably closed in structure so that its hose through the inlet opening is in connection with the feeder pipe of the melt and through the openings mentioned is in connection with the spraying area. By this construction is prevented the pumping of the gas from the nozzle, which causes increasing evaporation of alcohol and porosity of the droplets.

From the nozzle the melt of the complex compound transfers to the spraying area around the nozzle, where it is divided into fine melt droplets. To the spraying area is preferably conducted inert gas, which is preferably conducted close to the nozzle. The temperature of the inert gas is preferably about 20 to 40° C. and the flow amount is preferably about 500 kg/h. The intention of the inert gas flow is to prevent the colliding of the melt droplets to each other and their agglomeration. Hereby the matter is affected, except for the temperature and the flow amount of the gas, by its flowing direction, which can be directed e.g. by means of dividing plates so that the inert gas preferably rotates in the same direction as the rotating nozzle or the rotating member being attached to it.

From the spraying area the melt of the complex compound, which can also contain solid particles, is transferred to the cooled crystallization area, where the final solidification to solid carrier particles of even size takes place. A crystallization equipment has been developed for the spray-crystallizing process concerned which enables the preparation of high-quality carrier powder. By the equipment a high bulk density of the carrier powder, a narrow particle size distribution, loose particles, and the property of being easily sieved in order to achieve an even narrower particle size distribution, are achieved. The capacity of the equipment does not cause problems and the production by it is easy and labour saving.

According to one preferred embodiment a vertical chamber is used, in the upper end of which the nozzle mentioned is situated, in the upper portion around the nozzle and a little below it there is the spraying area, in the lower portion there is the crystallizing area and in the lower end there is the recovery opening of the carrier particles. The melt of the complex compound is fed through the rotating nozzle or respective to the spraying area in the form of small droplets and droplets of even size. The melt droplets coming from the rotating nozzle are distributed thanks to the nitrogen gas flow fed to the upper portion of the chamber in non-agglomerated state into the spraying area. The conditions of the spraying area are regulated so that the surface temperature of the sprayed melt droplets remains within the temperature range, in which they, when they collide with each other, do not easily agglomerate and, on the other hand, the evaporation of the alcohol contained therein is as insignificant as possible. Such a temperature of the melt droplets is a little below the melting point. The temperature of the nitrogen fed to the spraying area depends on the chemical composition of the melt and it preferably is the above-mentioned 20 to 40° C.

From the spraying area, in which some kind of solidification can take place, the droplets or particles fall against the crystallization area in the lower portion of the chamber. To the crystallization area or between the crystallization area and the spraying area in the middle portion of the chamber is preferably conducted inert gas. The temperature of this inert gas preferably is between −50 to +20° C. and its flow amount preferably is of the order of magnitude about 300 g/h. Hereby the droplets or particles settling apart of each other from the spraying area are crystallizing efficiently and the colliding of the crystallizing particles to each other is as insignificant as possible until even the surface of the particles has crystallized and the particles cannot agglomerate any longer.

The inert gas fed both to the upper portion of the chamber and to the middle and lower portion of it preferably is dry nitrogen. It is preferable to remove the inert gas through the outlet pipe or opening situated in the lower end of the chamber.

Finally, the solid carrier particles are recovered. This takes place preferably through an outlet opening located at the lower end of the above-mentioned chamber.

The method according to the present invention for the preparation of the solid carrier particles of a polymerization catalyst is best suited for providing such non-porous particles, the SPAN number describing the particle size distribution of which is between 1.1 to 1.6.

The recovered solid carrier particles are then brought together with a transition metal compound being able to catalytically activate, such as titanium tetrachloride, for providing an active olefin polymerization catalyst. The olefin polymerization catalyst prepared by the method can be used together with a cocatalyst and optionally together with an external electron donor for the polymerization of olefins.

BRIEF DESCRIPTION OF THE DRAWINGS

In the following the invention is described more closely with reference to figures, in which FIG. 1 depicts a crystallizing equipment used in one embodiment of the method according to the invention and FIG. 2 depicts a rotating type of nozzle used in one embodiment of the invention.

The crystallization equipment presented in FIG. 1 comprises a chamber 1 for spraying and crystallization, a reactor 2 for the preparation and/or melting of the complex and a feeding equipment 3 for the feeding of the melt complex compound from the reactor 2 to the chamber 1. The chamber comprises a nozzle 4, a spraying area 5, and a crystallization area 6. In the upper end of the chamber 1 there is the feed pipe 7 for inert gas, which leads in the middle of the chamber close to the nozzle 4. To the upper end of the chamber 1 is also arranged guide plates 8 of the inert gas flow, by which the inert gas flow is guided to minimize the agglomeration of the melt droplets. The temperature of the inert gas fed to the upper end of the chamber 1 is $T_1$, and its flow amount is $F_1$.

Beneath the spraying area 5 of the chamber 1 there is another inlet pipe 8 of inert gas, from which inert gas is conducted to the middle portion of the chamber 1. The temperature of the gas fed to the middle portion is $T_2$ and the flow amount $F_2$.

Beneath the inlet opening of the inlet pipe 8 for the inert gas situated in the middle portion of the chamber 1, there is in the chamber 1 a crystallization area 6. In the lower portion of the crystallization area 6 there is an outlet pipe 9 for the gas, through which all inert gas is removed.

At the lower end of the chamber 1 there is in the middle an outlet opening 10 for the finished product.

Reactor 2 is through pipe 11 in connection with the feed pump 12 of the melt, which is e.g. a valveless cylinder dosage pump. Between the pump 12 and the chamber 1 there is pipe 13, which is furnished with a pulse attenuator 14.

The piping between the reactor 2 and the chamber 1 is furnished with a heating mantle 15.

The method according to the present invention functions technically so that the components of the complex compound are fed to the reactor 2, in which they are changed by means of heat and agitation to a melt complex compound. The finished melt is fed by means of a dosage pump 12 to a rotating nozzle 4 in the upper portion of the chamber 1. The amount and evenness of the feed is achieved by the aid of an accurate valveless cylinder dosage pump 12 and a pulse attenuator 14. The temperature of the melt is kept constant and accurately regulated in the feed piping 11 and 13 and in the pump 12 by means of an oil heating mantle 15 of the piping 11 and 13.

The rotating nozzle 4 is closed in structure so that nothing else but melt to be sprayed goes into it. The rotating nozzle 4 preferably is a hollow disc, which when rotating at a rate of 18,000 to 25,000 rpm sprays small melt droplets to the spraying area 5 through small nozzle holes in the outer surface of its periphery.

From the nozzle 4 the melt is sprayed to the spraying area of the chamber 1, in which the droplets are kept apart from each other by the aid of inert gas fed into the upper portion of the chamber 1 close to the nozzle 4. The inert gas flow is regulated by means of dividing plates 8 to prevent the agglomeration of the melt droplets.

From the spraying area 5 the droplets or particles fall apart from each other downwards in chamber 1 colliding in the middle portion of the chamber to another gas flow fed from a separate feeder pipe 8. This gas flow is colder than the above-mentioned gas flow and causes a total solidification and at least a partial crystallization in the droplets or particles. When the droplets or particles have come into contact with the last-mentioned gas flow they crystallize in the crystallizing area 6 and get their final physical properties. The inert gas used is removed from the outlet pipe 9 in the lower portion of the chamber and the finished solid carrier particles fall on the conical bottom of the chamber, in the middle of which is the outlet opening 10 of them.

Figure 2:
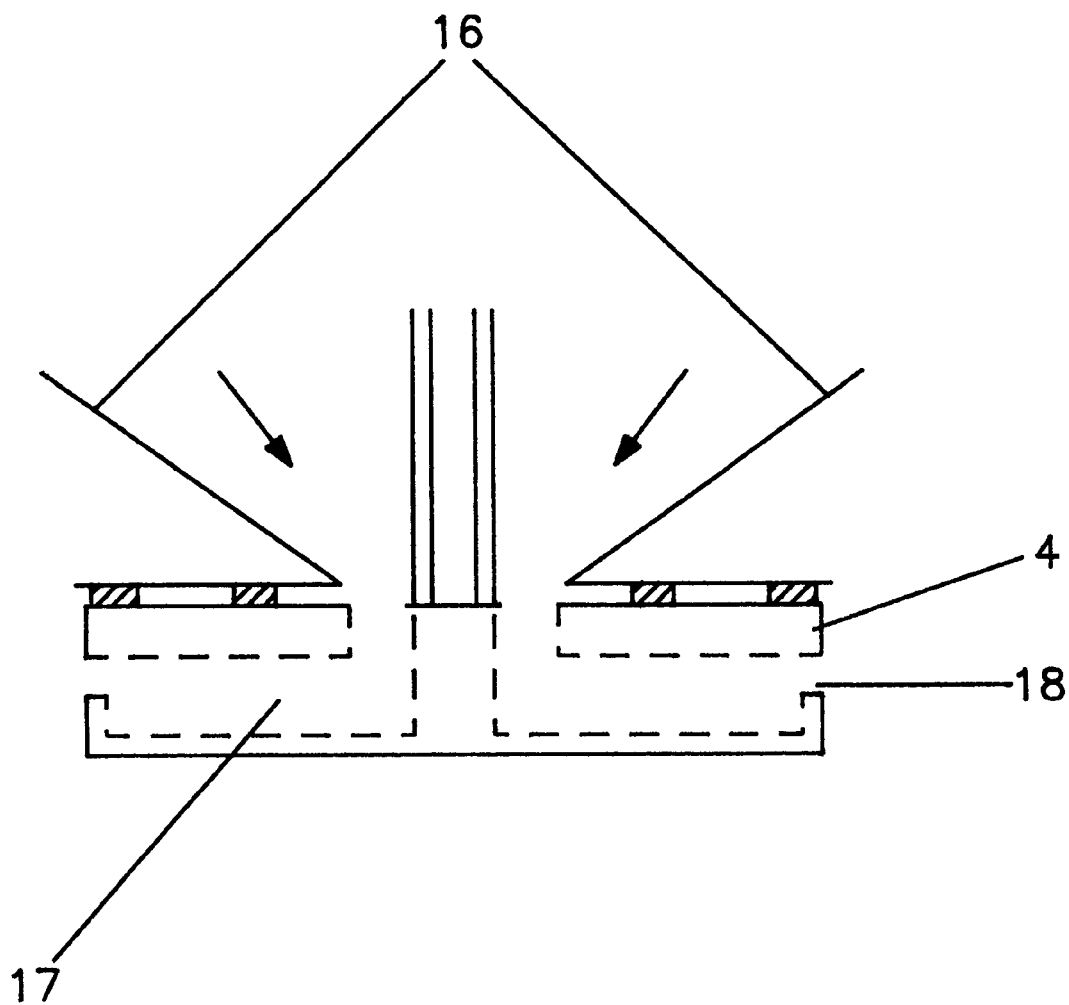

In FIG. 2 there can be seen the rotating disc nozzle 4 according to one embodiment of the invention, to which no gas can get from the surroundings.

The melt is fed into the nozzle through cone 16 so that it fills the hollow space 17 of the disc 4.

In the outer periphery surface of the disc 4 there are the nozzle holes 18, through which the melt is thrown to the spraying area by the aid of centrifugal force.

The diameter of the disc nozzle shown in the figure preferably is 100 to 150 mm and it preferably has four nozzle holes, the diameter of which is about 4 mm. It preferably rotates with the speed of rotation of about 20,000 rpm.

In the following an example is presented for the illustration of the invention.

EXAMPLE

Preparation of the melt

In the preparation of the melt $MgCl_2$ is first dosed to the reactor and after that the ethanol and the optional internal donor as indicated in the table I. The reactor is closed and the heating is started. When the temperature of the reactor is +120° C., the mixer is started and the increasing of the temperature is continued until +130° C. The agitation time of the melt depends on the amount of the $MgCl_2$ to be dosed so that 26 kg of $MgCl_2$ requires an agitation of four hours at 130° C. and 52 kg six hours at the same temperature.

Processing conditions

As the gas coming to the chamber dried nitrogen is used, which is conducted into two points of the chamber according to FIG. 1. The best angle of the gas dividing plate in the upper portion of the chamber 1 is 45° with respect to the vertical line so that the gas coming inside the chamber 1 circulates in the same direction as the rotating disc 4.

The speed of rotation of the rotating nozzle is 24,000 rpm and it is closed in structure and it has four nozzle holes having the diameter of 4 mm. The feeding rate of the melt is 30 kg/h for all the carriers of the table.

The results

The best processing conditions for the various melt compositions have been presented in Table I.

TABLE I

| Carrier | Feed temperature of the melt °C. | $T_1$ °C. | $T_2$ °C. | $F_1$ kg/h | $F_2$ kg/h |
|---|---|---|---|---|---|
| $MgCl_2$ 3, 0EtOH | 130 | 35 | 10 | 500 | 300 |
| $MgCl_2$ 3, 5EtOH | 120 | 30 | 10 | 500 | 300 |
| $MgCl_2$ 4, 0EtOH | 115 | 28 | 5 | 500 | 300 |
| $MgCl_2$ 4, 5EtOH | 110 | 25 | 0 | 500 | 300 |
| $MgCl_2$ 3, 5EtOH 0.05 DIPB | 115 | 35 | −5 | 500 | 300 |
| $MgCl_2$ 3, 5EtOH 0.05 DEME | 110 | 35 | −5 | 500 | 300 |

In Table I EtOH depicts ethanol, DIPB di-isobutyl phthalate and DEME diethylmaleate. $T_1$ and $F_1$ depict the corresponding temperature and flow amount of the inert gas fed into the upper portion of the chamber 1 according to FIG. 1 through pipe 7 and $T_2$ and $F_2$ depict the corresponding temperature and flow amount of the other inert gas flow fed into the middle portion of the chamber 1 through pipe 8.

When in the present invention equipment according to FIGS. 1 and 2 and the above-described conditions were used carrier particles were obtained, the morphology, particle size and particle size distribution of which were retained when they were activated with titanium tetrachloride. The average particle size of the carrier activated with titanium tetrachloride was below 70 μm, whereby the cumulative mass portion of the particles of below 20 μm was below 10%. The narrowness $\{(d_{90}-d_{50})/d_{10}\}$ of the whole distribution was below 1.5.

Copolymerization was carried out with the catalyst, whereby triethyl aluminium was used as the cocatalyst. In the polymerization tests about 17 kg PP/g was obtained as a typical activity of the catalyst, whereby the bulk density of the polymer was 0.42 and its isotacticity index 98.0.

What is claimed is:

1. A method for the preparation of solid non-porous carrier particles for a polymerization catalyst, said particles being loose and of equal size, comprising the steps of feeding a melt of a complex compound having formula (I)

$$MgCl_2 \; nROH \; mED \qquad (I)$$

wherein ROH is an aliphatic alcohol, R is an alkyl group having 1 to 6 carbon atoms, ED is an electron donor, n is 1 to 6, and m is 0 to 1, to a rotating nozzle;

spraying the melt from the nozzle to a spraying area inside a vessel, while conducting inert gas at a temperature of 20° to 40° C. into an area of the vessel near the nozzle in the same direction as the rotation of the nozzle, thereby throwing the melt outward from the rotating center of the nozzle to the spraying area and dividing the melt into fine melt droplets; and transferring the melt droplets to a crystallization area into which inert gas is introduced at a temperature of −50° to 20° C., and crystallizing the melt droplets into nonagglomerated solid non-porous carrier particles which are loose and of equal size.

2. A method according to claim 1 for the preparation of solid non-porous carrier particles for an olefin polymerization catalyst, said particles being loose and of equal size, comprising the steps of providing a melt of a complex compound having formula (I)

$$MgCl_2 \; nROH \; mED \qquad (I)$$

in which ROH is an aliphatic alcohol, R is an alkyl having 1 to 6 carbon atoms, ED is an electron donor, n is 1 to 6 and m is 0 to 1;

feeding the melt to a hollow disc nozzle having a closed structure that is rotated at a speed of about 10,000 to 30,000 rpm, at a temperature of about 100 to 140° C. and at a feeding rate of about 10 to 50 kg/h;

spraying the melt from the nozzle to a spraying area of a vessel that has inert gas at a temperature of 20° to 40° C. conducted into the spraying area near the nozzle in the same direction as the rotation of the nozzle, wherein the melt is thrown outward from the rotating center of the nozzle to the spraying area and is divided into fine melt droplets;

transferring said fine melt droplets to a crystallization area into which inert gas is introduced at a temperature of −50° to 20° C., where said melt droplets crystallize into nonagglomerated solid non-porous carrier particles which are loose and of equal size; and recovering said nonagglomerated solid non-porous carrier particles.

3. A method of making a procatalyst for the polymnerization of olefins, comprising contacting the recovered solid carrier particles obtained from the process of claim 2 with a transition metal compound and optionally with an internal electron donor, and recovering said procatalyst.

4. The method according to claim 3, wherein the transition metal compound is titanium tetrachloride.

5. The method according to claim 1 wherein the speed of rotation of the nozzle is about 18,000 to 25,000 rpm.

6. The method according to claim 1 wherein the nozzle is a hollow disc nozzle which rotates around its axis and comprising surface holes in its outer periphery, wherein the melt is forced out through said surface holes by the aid of centrifugal force.

7. The method according to claim 6, wherein the diameter of the hollow disc nozzle is about 100 to 150 mm.

8. The method according to claim 6, wherein the hollow disc nozzle has four outer periphery surface holes, each having a diameter of about 4 mm.

9. The method according to claim 6, wherein the hollow disc nozzle has a hollow space between an inlet opening in contact with a feeder pipe for the melt and the outer periphery surface holes.

10. The method according to claim 1, wherein the inert gas, which is directed to the spraying area close to the nozzle, has a temperature of about 20 to 40° C. and a flow rate of about 500 kg/h.

11. The method according to claim 10, wherein the inert gas is directed by the aid of a dividing plate so that the inert gas circulates in the same direction as the rotating nozzle.

12. The method according to claim 1, wherein said vessel is a vertical chamber having the rotating nozzle in an upper end, the spraying area in an upper portion, the crystallization area in a lower portion, and a recovery opening for recovering the solid carrier particles in a lower end.

13. The method according to claim 12, wherein inert gas is conducted through a pipe to the crystallization area or between the spraying area and the crystallization area.

14. The method according to claim 13, wherein the temperature of inert gas fed to the crystallization area, or between the spraying area and the crystallization area, is −50 to +20° C. and the flow rate is about 300 kg/h.

15. The method according to claim 1, wherein ROH is ethanol, and n is 3 to 4.

16. The method according to claim 1, wherein ED is dialkyl phthalate or dialkyl maleate.

17. The method according to claim 16, wherein ED is diisobutyl phthalate or diethyl maleate.

18. The method according to claim 1, wherein m is about 0.05.

19. The method according to claim 1, wherein the nozzle rotates at a speed of about 10,000 to 30,000 rpm.

* * * * *

UNITED STATES PATENT AND TRADEMARK OFFICE
CERTIFICATE OF CORRECTION

PATENT NO. : 5,905,050
DATED : May 18, 1999
INVENTOR(S) : Koskinen, et. al.

It is certified that error appears in the above-indentified patent and that said Letters Patent is hereby corrected as shown below:

Title page, item "[75] Inventor:", please correct the spelling of the first inventor's name from "Jukka Koshinen" to – Jukka Koskinen –.

Signed and Sealed this

Thirtieth Day of November, 1999

Attest:

Q. TODD DICKINSON

Attesting Officer

Acting Commissioner of Patents and Trademarks